United States Patent [19]
McClelland et al.

[11] Patent Number: 5,661,766
[45] Date of Patent: Aug. 26, 1997

[54] NUCLEAR FUEL ASSEMBLY BOW AND TWIST MEASUREMENT APPARATUS

[75] Inventors: Richard G. McClelland, Richland; Howard D. Cross, Kennewick, both of Wash.

[73] Assignee: Siemens Power Corporation, Richaldn, Wash.

[21] Appl. No.: 389,701

[22] Filed: Feb. 14, 1995

[51] Int. Cl.$^6$ .................................................. G21C 17/06
[52] U.S. Cl. .......................... 376/245; 376/258; 33/502; 33/533; 33/549; 73/622; 73/633
[58] Field of Search ............................ 376/245, 258; 33/502, 533, 392, 549; 73/622, 633, 627

[56] References Cited

U.S. PATENT DOCUMENTS

| | | | |
|---|---|---|---|
| 3,621,580 | 11/1971 | Tovaglieri | 33/174 |
| 4,048,009 | 9/1977 | Weilbacher | 176/19 |
| 4,197,652 | 4/1980 | Qurnell et al. | 33/174 Q |
| 4,274,205 | 6/1981 | Starr et al. | 33/174 |
| 4,583,297 | 4/1986 | Jewell | 33/533 |
| 4,728,483 | 3/1988 | Ahmed et al. | 376/258 |
| 4,759,897 | 7/1988 | Tolino et al. | 376/245 |
| 4,847,037 | 7/1989 | Scharpenbert et al. | 376/245 |
| 5,112,566 | 5/1992 | Butzin et al. | 376/245 |
| 5,569,835 | 10/1996 | Kenny et al. | 73/15 |

*Primary Examiner*—Harvey E. Behrend
*Attorney, Agent, or Firm*—Ira Lee Zebrak

[57] ABSTRACT

An apparatus for measuring fuel assembly bow and twist comprising a fixturing apparatus, a reference device and an ultrasonic measuring device.

2 Claims, 4 Drawing Sheets

NUCLEAR FUEL ASSEMBLY BOW AND TWIST MEASUREMENT APPARATUS

INTRODUCTION

1. Field of the Invention

The present invention relates generally to fuel assemblies for nuclear reactors and, more particularly, to an apparatus for measuring fuel assembly bow and twist.

2. Background

In nuclear power reactors, the reactor core is comprised of a number of fuel assemblies. Depending on the size of the reactor, there can be 200 or more fuel assemblies in the core at any time. Since the fuel assemblies are densely packed in predetermined positions in the reactor core, dimensional standards of each fuel assembly must be met within very close tolerances. Pre-service quality assurance inspections are performed to ascertain any deviations in the formation and assembly of new fuel assemblies from accepted tolerances. The fuel assembly is also inspected to determine whether it is straight, unbowed, and without any twist.

During reactor operation, the fuel assemblies become irradiated and can become bowed and twisted due to differential growth resulting from thermal gradients and neutron flux gradients. During each reactor refueling cycle, fuel assemblies are moved to different locations in the reactor core, with some of the fuel assemblies being replaced by new fuel assemblies. Certain fuel assemblies become spent and are removed from the reactor. Since at least a portion of the irradiated fuel assemblies are moved from one location in the reactor core and eventually to another location in the core during refueling operations, there is a need to verify the continued serviceability of these fuel assemblies.

Thus, the accurate and efficient determination of deviations from dimensional standards of the fuel assembly as well as whether the fuel assembly is straight, unbowed and without twist is particularly important for irradiated fuel assemblies which have to be inspected and remotely manipulated to protect personnel against exposure.

Pressurized water reactor nuclear fuel assemblies are positioned at their lower ends in predetermined positions in the lower core support plate of the reactor. Depending upon the particular design, each fuel assembly typically has two alignment pins extending downward from the lower tie plate and which are received in alignment holes in the lower core support plate. The upper core support plate which is positioned on top of all the fuel assemblies serves to align the upper portion of the fuel assemblies. Extending downward from the underside of the upper core plate are fuel assembly alignment pins. Typically, two alignment pins insert into two alignment holes in the upper tie plate of each of the fuel assemblies. As the upper core support plate is aligned over the top of the reactor core support and lowered onto the fuel assemblies, the alignment pins slide into their respective alignment holes and align the upper portion of the fuel assemblies into their predetermined positions.

Bowing or twisting of the fuel assembly can prevent the accurate alignment of the fuel assembly with the upper and/or lower core support plate, cause interference with adjacent components, and in extreme cases, significantly increase the insertion force of control rods. Moreover, the bow and twist of the fuel assembly in its freestanding or unconstrained condition usually bears little resemblance to its constrained position within the reactor core between the upper and lower core support plates. In addition, the bow and twist of the fuel assembly is frequently not perceived until the fuel assembly is attempted to be placed within its constrained position within the reactor core between the upper and lower core support plates.

In some prior art designs, assembly bow is measured by very simple measurement techniques which however have the disadvantage of not being accurate. The most common places a long straight edge suspended from the upper tie plate of the fuel assembly to the bottom tie plate and the distance from the straight edge to the assembly body is measured. This type of device and all such similar devices require viewing and thereby suffers from errors of observation such as parallax, which is exacerbated for irradiated fuel assemblies which are inspected underwater usually with a television camera.

Other prior art designs involve devices which position a component in direct physical contact with the fuel assembly. Some of such prior art designs utilize linear variable differential transformer (LVDT) which is an electromechanical transducer which produces an electric output which is proportional to the movement or displacement of an interrelated component positioned to physically engage or contact a portion of the fuel assembly. However, LVDT systems have several disadvantages which impact the accuracy of the measurements. First, LVDT devices must be in constant contact with the fuel assembly with the possibility that the measuring device affects the position of the measured feature (e.g. a fuel rod) of the fuel assembly. Secondly, the surface area of the measuring device (i.e. the end of the LVDT) must be sufficiently large to always measure the same feature of the fuel assembly irrespective of the amount of bow and twist, otherwise the LVDT may cause interaction with a feature or features adjacent to the measured feature. These errors introduced by measurement system interaction with the fuel assembly by the use of LVDT's can therefore be significant.

Some of the prior art designs utilize proximity sensors which produce an inductive field which generates eddy currents in the portion of the fuel assembly within its range. These eddy currents change the state of the field which can be translated into an output signal that is proportional to the distance from the sensor to the portion of the fuel assembly being examined or measured. Such eddy current sensors suffer from the disadvantage of having very limited range and must therefore be close to the fuel assembly. In addition, with large bowing or large twisting, there is the possibility of interaction with an adjacent feature. Furthermore, the accuracy of eddy current sensors is limited by material conductivity changes as well as oxide and crud build-up.

The prior art discloses devices in which the fuel assembly which is to be measured forstraightness, bow and twist, is simply supported and held in a position in such a way as not to impart any loads to it by twisting or tilting. Thus, the fuel assembly is not rigidly constrained as if the assembly was actually positioned within the reactor core. In one prior art design, the fuel assembly is suspended from its upper end on a support having a profile similar to the fuel assembly, and a measuring device is moved along the support. The measuring devices are typically moved on a carriage along the support at a predetermined distance from the fuel assembly by a guide system. Even if the guide system, typically guide rails of some sort, is made to be as straight as possible, the guide system or guide rails which is not perfectly straight will usually develop further imperfections or flaws during operating which will cause them not to remain straight. Since these guide systems do not generally compensate for any deviation from its correct path of travel, the error introduced by the deviation produces inaccuracies in the measurements of the fuel assembly. Efforts of the prior art to correct this error include the use of positioning sensing apparatus which detects when the guide system moves beyond an acceptable tolerance relative to its correct position. However, the complexities of these positioning sensing apparatus can introduce further errors or inaccuracies in addition to the inaccuracies introduced by the guidance system.

As stated above, further or other errors can be introduced in the determination of the amount of bow and twist of the fuel assembly as positioned within the core by not placing the fuel assembly in a rigid fixture to constrain the fuel assembly as if it was actually positioned within the reactor core.

Thus, the prior art devices are inaccurate in the measurement of bow and twist due to errors of observation (such as parallax), measurement system/fuel assembly interaction errors, guiding system inaccuracies, positioning/sensing systems inaccuracies, and inaccuracies due to the failure to measure the fuel assembly when constrained in a rigid fixture as if the fuel assembly was actually positioned within the reactor core.

OBJECT OF THE INVENTION

It is a general object of the invention to provide a system for measuring nuclear fuel assembly bow and twist which avoids the disadvantages of the prior art teachings while affording greater accuracy and facility of operation.

SUMMARY OF THE INVENTION

In accordance with one aspect of the invention, an apparatus is provided for measuring dimensional characteristics of a nuclear fuel assembly having at its lower end a lower alignment pin being extending downward from a lower tie plate, the lower alignment pin being positioned and oriented for engaging a corresponding alignment hole in a lower core support plate of a nuclear reactor, the fuel assembly having at its upper end an upper alignment hole located in the upper tie plate, the upper alignment hole being positioned and oriented for receiving an alignment pin extending downward from the underside of an upper core support plate. The apparatus comprises: (a) an elongated fixture defining an internal volume for a nuclear fuel assembly, the fixture mounted in an upright position and having an opening disposed towards an upper end of the fixture, the opening adapted to receive the fuel assembly therethrough, the fixture further including a removable top adapted to fit into the opening and having a locating pin with a longitudinal axis extending from its underside for engaging the upper alignment hole in the upper tie plate of the fuel assembly, the fixture further including at a lower end a bottom reference plate adapted to form a locating hole having a second longitudinal axis for receiving the lower alignment pin of the fuel assembly, the locating pin and the locating hole being adapted to engage the fuel assembly lower alignment pin and the fuel assembly upper alignment hole so as to constrain the fuel assembly as if the fuel assembly was positioned in the reactor, and at least one of the first longitudinal axis and the second longitudinal axis defines a predetermined longitudinal axis of the fixture. The apparatus further includes (b) at least one reference wire extending from the upper end of the fixture to the lower end of the fixture, the at least one reference wire being disposed parallel to the predetermined longitudinal axis of the fixture, and (c) an ultrasonic measuring device comprising: a transponder for (I) producing an ultrasonic signal toward the at least one reference wire and the fuel assembly, and (II) receiving a first reflected wave from the ultrasonic signal reflected from the at least one reference wire back to the transponder and (III) receiving a second reflected wave from the ultrasonic signal reflected from the fuel assembly back to the transponder. The ultrasonic measuring device further includes an ultrasonic flaw detector for receiving a signal from the transponder of the first reflected wave and the second reflected wave where the time difference between the first reflected wave and the second reflected wave is a measure of the distance from the reference wire to the fuel assembly. The apparatus further includes (d) transmission means which transmits from the transponder the signal of the first reflected wave and signal of the second reflected wave to the ultrasonic flaw detector.

DETAILED DESCRIPTION

The system of the present invention measures the bow and twist of either an unirradiated nuclear fuel assembly, or an irradiated nuclear fuel assembly which has been removed from the reactor core. This is done by using a non-contact measuring device in the form of an ultrasonic transponder and a reference measure from which the measurements are made in conjunction with a fixture which constrains the fuel assembly as if the fuel assembly was in the reactor core. By simulating the fuel assembly's actual position within the core, the effect of loading conditions which may not otherwise be present upon bow and twist in the fuel assembly can be measured.

Figure 1:
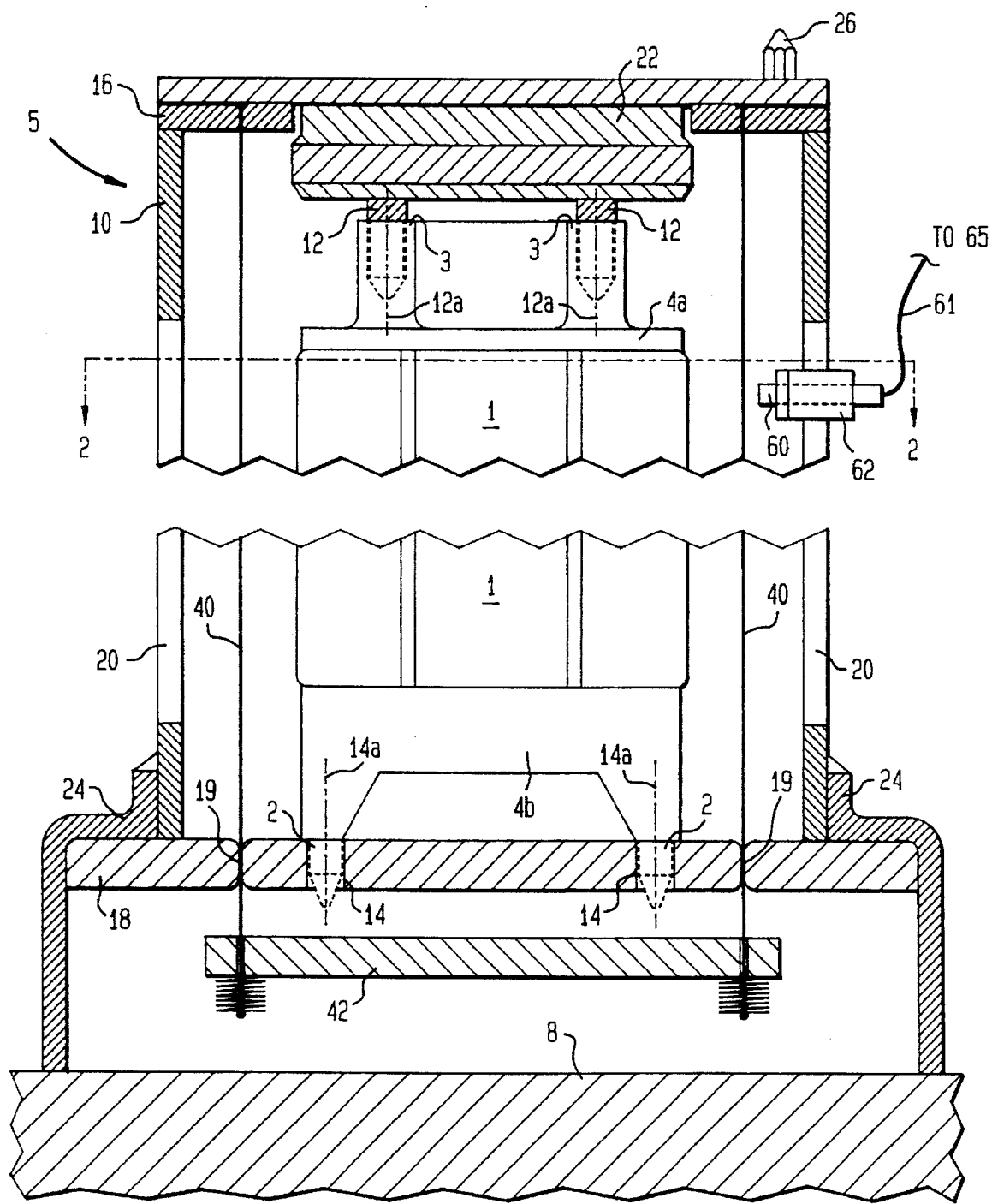
FIG. 1 depicts in a side elevational view, partly in section, the fuel assembly bow/twist measuring apparatus of the present invention.

Referring to FIG. 1, the system of the present invention is shown. An irradiated fuel assembly 1 shown in schematic form is positioned under water within the fuel assembly bow and twist measuring apparatus 5 in accordance with the present invention. The details of the fuel assembly have been omitted from FIG. 1 for clarity of illustration.

Although the present invention is shown and described with reference to an irradiated fuel assembly, an unirradiated or new fuel assembly may similarly be measured by the present invention.

The fuel assembly bow and twist measuring system comprises a fixturing apparatus, a reference device, and an ultrasonic measurement device as more fully discussed below. The fuel assembly bow and twist measuring system is positioned underwater to provide protection from the radiation emitted from the irradiated fuel assembly.

The fixturing apparatus includes a large diameter tube 10 which encloses the entire length of fuel assembly 1. Tube 10 is secured at its lower end to bottom reference plate 18 and both are secured by flanges 24 which extend downward and rest on a support surface which is depicted in FIG. 1 as the floor of a nuclear fuel assembly spent fuel pool 8 of a typical nuclear power plant (not shown). At the upper end of tube 10 is a top flange 16 which extends around the inner wall of tube 10. Also at the upper end of tube 10 is a removable top 22 which when removed, enables the placement of the fuel assembly within the fuel assembly bow twist measuring apparatus. Bottom reference plate 18 has locating holes 14 which receive the lower alignment pins 2 of fuel assembly 1. Extending from the underside of top 22 are locating pins 12 which engage alignment holes 3 in the top of fuel assembly 1.

Each locating pin 12 has a longitudinal axis 12a which defines the longitudinal axis of the fixture. Each locating hole 14 similarly has a longitudinal axis 14a which also defines the longitudinal axis of the fixture. Depending upon the design of the fuel assembly, the longitudinal axis of the fixture can be either the longitudinal axis of a locating pin or the longitudinal axis of a locating hole. In some fuel assembly designs, the fuel assembly lower alignment pins and upper alignment holes are positioned to be collinear in which case the longitudinal axis of the locating pin and the longitudinal axis of the locating hole are also collinear.

Locating pins 12 and locating holes 14 are positioned and oriented so as to position the fuel assembly upper tie plate 4a and lower tie plate 4b in relationship to each other as would be found when the fuel assembly is positioned in the reactofuel assembly fuel assembly 1 is placed in the fuel assembly bow twist measuring apparatus 5, fuel assembly position in the reactor core during operating conditions is thereby simulated. Although the configuration of locating pins 12 and locating holes 14 are dependent upon the particular fuel assembly design, the number and position of locating pins and holes in top 22 and bottom plate 18 can be changed to accommodate virtually any fuel assembly type and shape. Thus, while fuel assemblies for boiling water reactors generally do not have lower alignment pins and upper alignment holes, they can nonetheless be tested and measured in the apparatus of the present invention.

The reference device includes small diameter reference wires 40(a, b, c, d, e, f, g, and h) which extend from top flange 16 through apertures 19 in bottom reference plate 18 and is secured at its lower end to floating plate 42. Apertures 19 are so positioned in bottom reference plate so that reference wires 40 are each parallel to the longitudinal axis 14a of locating holes 14, as well as the longitudinal axis 12a of locating pins 12 when the removable top is placed in position on the upper flange. Since the longitudinal axis of either the locating pin 12a or the locating hole 14a determines the longitudinal axis of the fixture, the reference wires are parallel to the longitudinal axis of the fixture. The weight of floating plate 42 provides constant tension in reference wires 40. The position of reference wires 40 provide a known relationship between the fuel assembly and the fixture. The number and position of reference wires 40 can be changed (together with the position and orientation of locating pins 12 and locating holes 14) to accommodate different fuel assembly designs.

Figure 2:
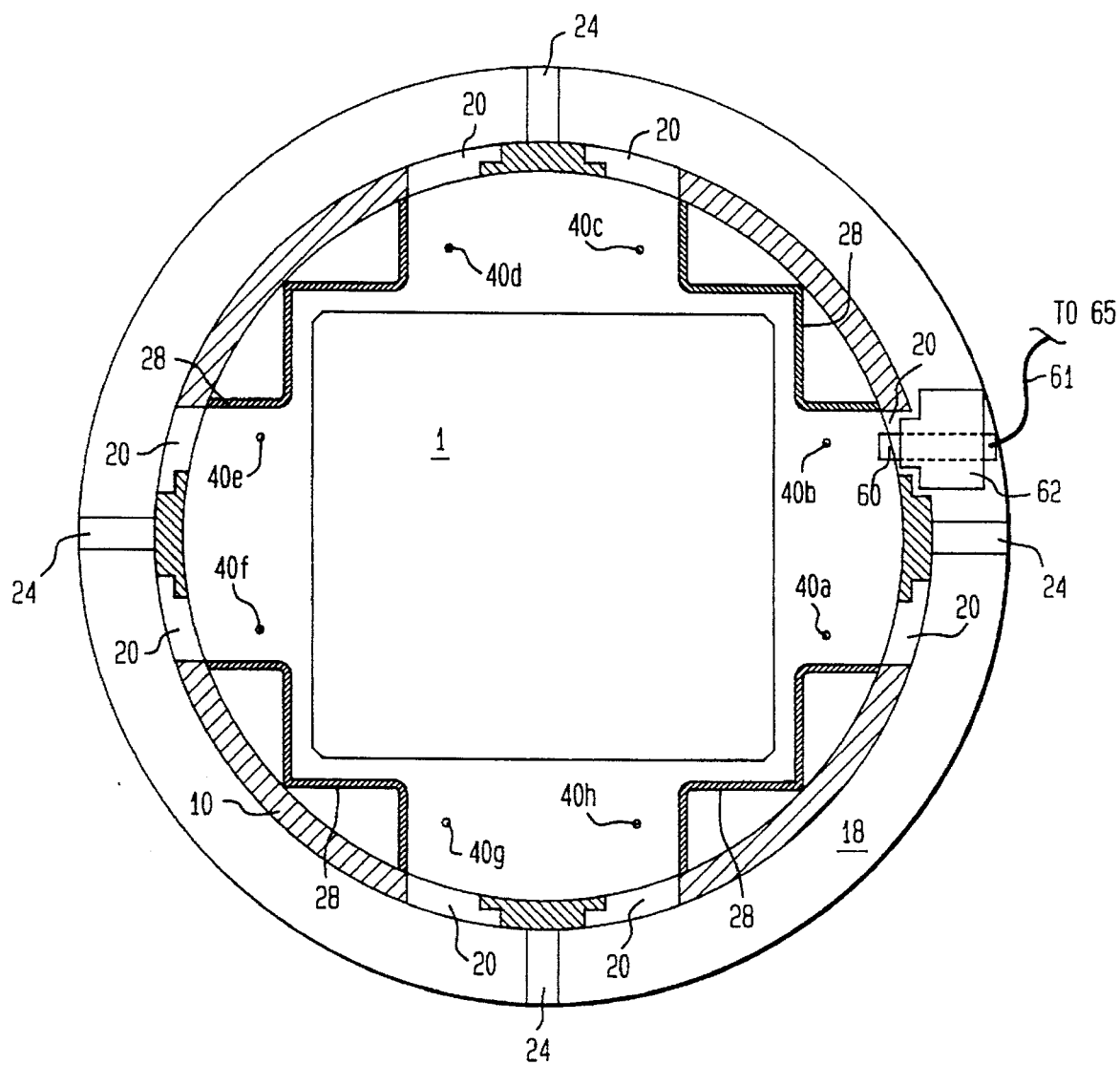
FIG. 2 is a cross-sectional view taken along line 2—2 of the apparatus depicted in FIG. 1.
Figure 3:
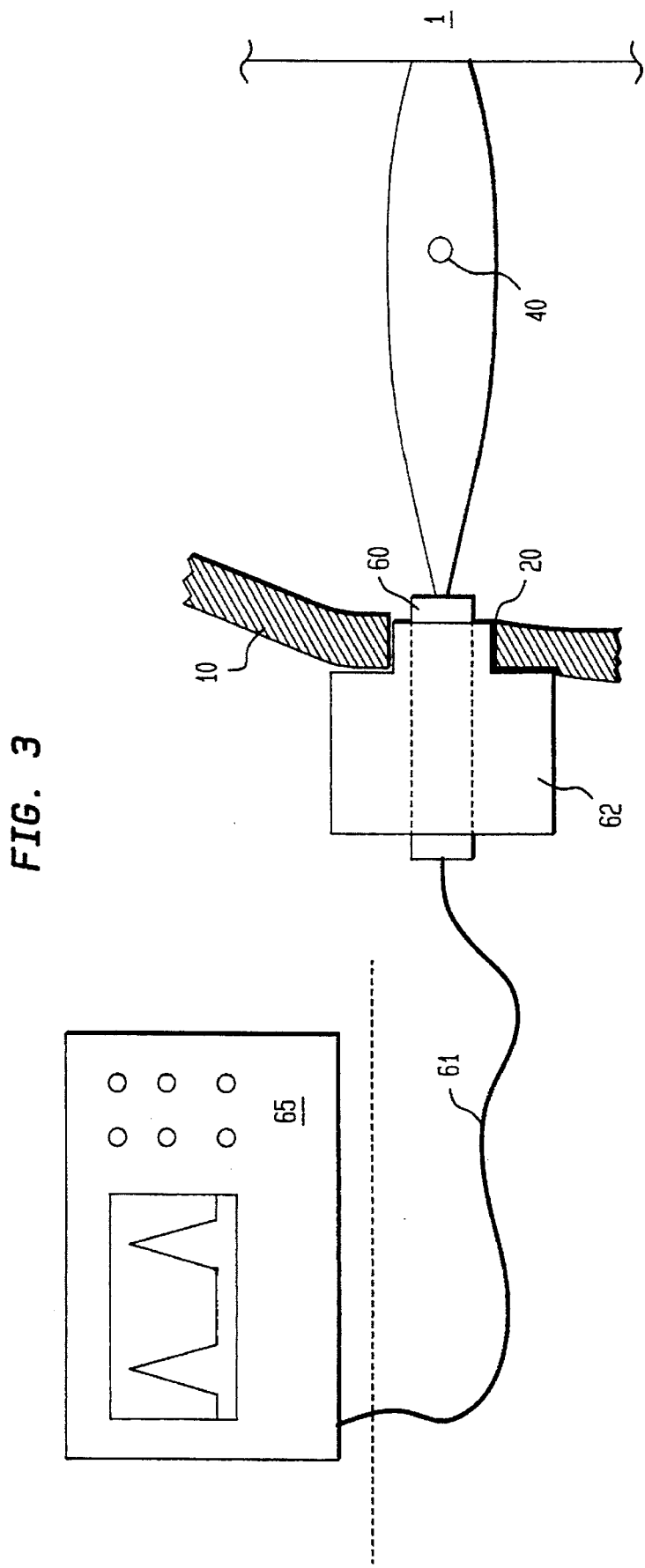
FIG. 3 depicts the measuring system positioned in a slot in the wall showing the ultrasonic transponder, transponder holding block and ultrasonic flaw detector.

Extending longitudinally through tube 10 are slots 20 which provide openings for the measurement system. The slots 20 are positioned in tube 10 so as to provide a line of sight access to the reference wire 40 which is orthogonal to the fuel assembly 1 as shown in FIG. 2 and more particularly in FIG. 3. The measuring system comprises a transponder 60, a transponder holding block 62, cable 61 which connects transponder 60 to an ultrasonic flaw detector 65 which makes time of flight measurements of ultrasonic signals from transponder 60. As shown in FIG. 3, transponder 60 is positioned in a slot 20 so that it, a reference wire 40, and the specific region or detail of the fuel assembly (e.g. a fuel rod or a guide bar) are in a line of sight which is orthogonal to the detail of the fuel assembly to be measured.

After being positioned in one of slots 20 and aimed toward the reference wire 40 and fuel assembly 1, transponder 60 in holding block 62 produces an ultrasonic signal which propagates through the water towards the fuel assembly. A portion of the ultrasonic wave is first reflected from reference wire 40 back to transponder 60 and the remaining wave which occurs later in time, is reflected from the fuel assembly detail back to transponder 60. These signals are then transmitted via cable 61 to ultrasonic flaw detector 65. The time differential between the two signals which is a measure of the distance from the reference wire to the fuel assembly is converted by ultrasonic flaw detector 65 by multiplying the time difference by the velocity of the sound wave through the propagating medium, which for irradiated fuel rods is water. This provides an accurate distance measurement from the reference wire 40 to the detail of the fuel assembly 1.

Since the time of flight measurement is performed only from the reference wire to the fuel assembly feature, any error in determining the distance from the ultrasonic transponder to the reference wire is avoided. Thus, accurate positioning of the measuring device relative to a reference position as is attempted in the prior art devices, is not required by the present invention.

Transponder 60 is moved from its initial position in a slot 20 to successive positions along the length of the slot where additional ultrasonic signals are produced, and reflected waves from the reference wire and the fuel assembly are received to yield distance measurements from the reference wire to the detail of the fuel assembly as a function of the height of the fuel assembly. The transponder 60 would then be moved to each of the other slots and measurements would again be taken along the height of the fuel assembly or at selected elevations.

After placing the nuclear fuel assembly bow and twist measurement apparatus (with the exception of the ultrasonic flow detector 65) on a support surface such as the spent fuel pool floor 8, the apparatus is operated by removing top 22 and placing fuel assembly 1 guided by guides 28 into tube 10, and positioning the fuel assembly lower locating pins 2 in lower locating holes 14 in bottom plate 18. Top 22 would be installed onto top flange 16 and locating pins 12 would be inserted into the fuel assembly upper tie plate holes 3 to secure and position the assembly as if actually positioned within the reactor core. The ultrasonic transponder would be positioned in a slot and measurements taken. The signals received by the transponder from the reference wire and the fuel assembly are transmitted to the ultrasonic flaw detector positioned outside of the spent fuel pool where distance readings would be recorded manually or by a computer. The transponder would be moved in the slot or if desired in any of the other slots and measurements taken at selected locations along the height of the assembly. After all desired measurements were obtained, the top would be removed, and the assembly extracted.

Figure 4B:
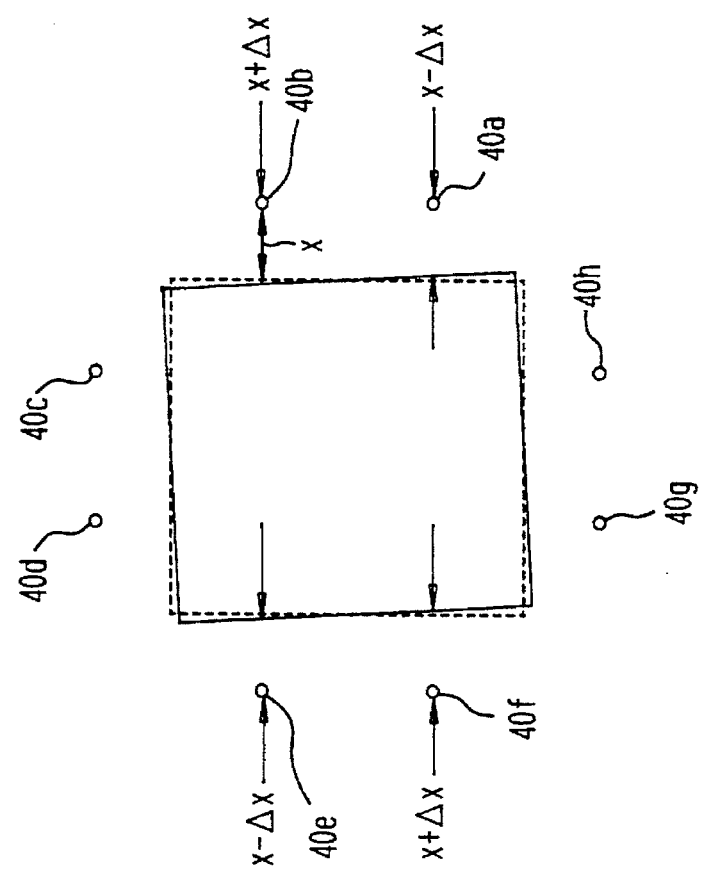
FIGS. 4A and 4B depict the presence of bow and twist in a fuel assembly.
Figure 4A:
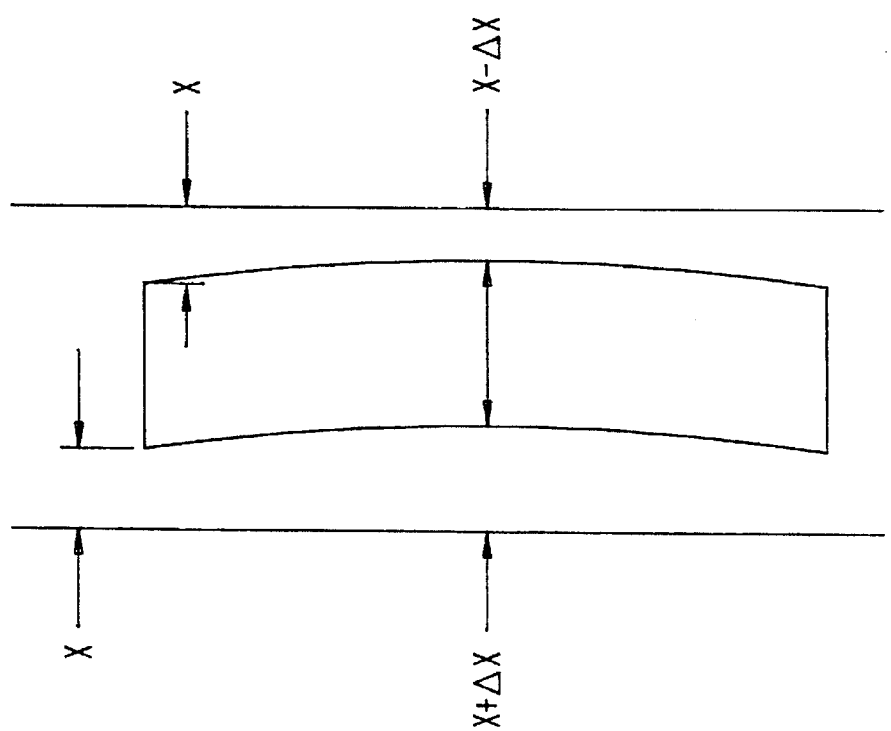

Data indicating variations in the distance from the reference wires to the fuel assembly details are a direct measure of bow. For measuring single axis assembly bow, distance variations from adjacent reference wires (e.g. 40a and 40b) on the same side of the fuel assembly will show equal displacement, e.g. $x+\Delta x$ where x is the distance from the reference wire to the upper lower tie plate of the fuel assembly, while the corresponding readings from the reference wires on opposite side of the assembly (e.g. 40e and 40*f*) will show the same magnitude displacement but in the opposite displacement direction, e.g. x−Δx. (See FIG. 4A) Readings from the adjacent sides of the assembly will show no displacement readings when there is single axis assembly bow. Two axis bow is determined similarly with the exception that all four sides will show displacement magnitude and direction.

For determining assembly twist, adjacent readings on the same side of the fuel assembly will show an opposite direction displacement. (See FIG. 4B). The displacement magnitude is a measure of the magnitude of the assembly twist. Comparison of corresponding reference data from the opposite side of the assembly will produce the same displacement magnitude but in opposite direction.

An assembly with both bow and twist can be measured by a comparison of the differences in displacement magnitudes and directions from both corresponding opposite and adjacent reference measurements.

One of the advantages of the present invention over the prior art is that bow and twist measurements of the fuel assembly positioned and constrained as if it was in the reactor core can be obtained. In addition, since the time of flight measurement is performed only from the reference wire to the fuel assembly feature, the distance from the ultrasonic transponder to the reference wire is irrelevant. Thus, precise positioning me the measuring device relative to a reference position as in the prior art devices, is not required by the present invention. Therefore, an additional advantage of the preset invention is that the precise positioning of the measuring device is not required thereby eliminating inaccuracies and/or the need to provide additional devices intended to correct for the improper positioning of the measuring device. A further advantage of the present invention is the use of ultrasonics for distance measurements which insures greater accuracy (±0.10 inch) due to the elimination of the interaction between the measuring system and the fuel assembly.

While the foregoing description and drawings represent the preferred embodiments of the present invention, it will be understood by those skilled in the art that various changes and modifications may be made therein without departing from the true spirit and scope of the present invention.

We claim:

1. An apparatus for measuring dimensional characteristics of a nuclear fuel assembly having at its lower end a lower alignment pin extending downward from a lower tie plate, the lower alignment pin being positioned and oriented for engaging a corresponding alignment hole in a lower core support plate of a nuclear reactor, the fuel assembly having at its upper end an upper alignment hole located in the upper tie plate, the upper alignment hole being positioned and oriented for receiving an alignment pin extending downward from the underside of an upper core support plate; the apparatus comprising:

(a) an elongated fixture defining an internal volume for a nuclear fuel assembly, the fixture mounted in an upright position and having an opening disposed towards an upper end of the fixture, the opening adapted to receive the fuel assembly therethrough, the fixture further including a removable top adapted to fit into the opening and having a locating pin with a longitudinal axis extending from an underside for engaging the upper alignment hole in the upper tie plate of the fuel assembly, the fixture further including at a lower end a bottom reference plate adapted to form a locating hole having a second longitudinal axis for receiving the lower alignment pin of the fuel assembly, the locating pin and the locating hole being adapted to engage the fuel assembly lower alignment pin and the fuel assembly upper alignment hole so as to constrain the fuel assembly as if the fuel assembly was positioned in the reactor, at least one of the first longitudinal axis and the second longitudinal axis defining a predetermined longitudinal axis of the fixture;

(b) at least one reference wire extending from the upper end of the fixture to the lower end of the fixture, the at least one reference wire being disposed parallel to the predetermined longitudinal axis of the fixture;

(c) an ultrasonic measuring device comprising:
  (1) a transponder for
    (I) producing an ultrasonic signal toward the at least one reference wire and the fuel assembly, and
    (II) receiving a first reflected wave from the ultrasonic signal reflected from the at least one reference wire back to the transponder and
    (III) receiving a second reflected wave from the ultrasonic signal reflected from the fuel assembly back to the transponder, and
  (2) an ultrasonic flaw detector for receiving a signal from the transponder of the first reflected wave and the second reflected wave where the time difference between the first reflected wave and the second reflected wave is a measure of the distance from the at least one reference wire to the fuel assembly; and (d) transmission means which transmits from the transponder the signal of the first reflected wave and signal of the second reflected wave to the ultrasonic flaw detector.

2. The apparatus as in claim 1 wherein the fixture is adapted to have slots extending longitudinally therethrough.

* * * * *

UNITED STATES PATENT AND TRADEMARK OFFICE
CERTIFICATE OF CORRECTION

PATENT NO.  : 5,661,766
DATED       : August 26, 1997
INVENTOR(S) : McClelland et al.

It is certified that error appears in the above-indentified patent and that said Letters Patent is hereby corrected as shown below:

Title Page, Item 73, Assignee: Siemens Power Corporation, "Richaldn"--Richland--Wash.

Signed and Sealed this

Seventeenth Day of March, 1998

*Attest:*

BRUCE LEHMAN

*Attesting Officer*      *Commissioner of Patents and Trademarks*